K. ALQUIST.
FLEXIBLE GEAR.
APPLICATION FILED JULY 25, 1912.

1,141,098. Patented June 1, 1915.

Witnesses:
Marcus L. Byng.
J. Ellis Glen

Inventor:
Karl Alquist,
by Albert G. Davis
His Attorney.

UNITED STATES PATENT OFFICE.

KARL ALQUIST, OF SCHENECTADY, NEW YORK.

FLEXIBLE GEAR.

1,141,098.　　　　　　Specification of Letters Patent.　　Patented June 1, 1915.

Application filed July 25, 1912. Serial No. 711,546.

*To all whom it may concern:*

Be it known that I, KARL ALQUIST, a subject of the King of Sweden, residing at Schenectady, county of Schenectady, State of New York, have invented certain new and useful Improvements in Flexible Gears, of which the following is a specification.

My invention relates to flexible gears and more especially to gears built up of a plurality of elements or laminations and provided with helical teeth whereby pressure exerted by a coöperating gear upon the tooth portions of the elements will operate to deflect them axially and thereby effect a yielding action in the direction of rotation. I have already shown and described in my co-pending application Serial No. 639,210, filed July 18, 1911, a flexible gear of the character referred to.

The object of the present invention is to provide a construction which shall be stronger and more durable than any of the flexible gears heretofore produced.

In the flexible gears made up of elements or laminæ of uniform thickness and each tooth carried upon an arm or extension, increased flexibility can be accomplished only by increased length of arm or extension, and this increased length of arm or extension can only be made at a sacrifice in the strength of the arm. In order to overcome this objection, I propose to form each element of my built up gear with alternate teeth left out, so that in undercutting below the base of the tooth to form the arms or extensions sufficient metal will remain at the base of the arm or extension to effectually sustain the stresses imposed upon the tooth in operation.

My invention is illustrated in the accompanying drawing forming a part of this specification, in which—

Figure 1:
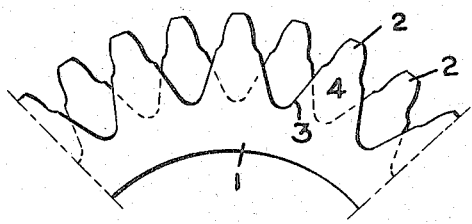
Figure 2:
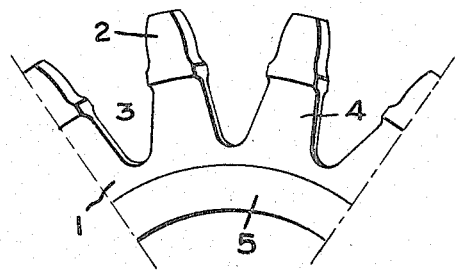
Figure 3:
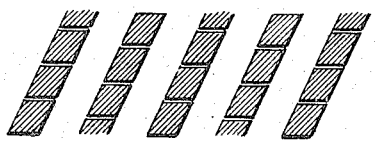
Figure 4:
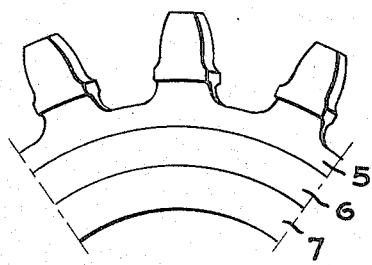
Figure 5:
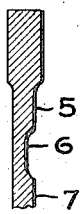
Figure 6:
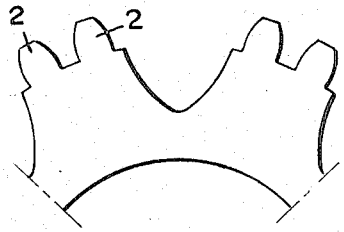

Figure 1 shows in side elevation segments of two elements with their teeth in stepped relation; Fig. 2 is a side elevation of a segment of an element having its teeth of greater thickness than the arms or extensions thereof; Fig. 3 is a developed section taken upon the pitch circle of a gear built up of elements shown in Fig. 2; Fig. 4 is a view similar to Fig. 2 showing modification; Fig. 5 is a section of the form of element shown in Fig. 4; and Fig. 6 is a side elevation of an element with the teeth in groups with corresponding spaces between.

As shown in Fig. 1, the individual elements 1 are of uniform thickness as when made preferably of sheet steel. The teeth 2 are formed on the periphery thereof and between the teeth deep notches 3 are cut whereby relatively long arms or extensions 4 between the base of the tooth and the uncut portion of the element are formed. Any two adjacent elements will be mounted upon a suitable hub so that the teeth of one element are in stepped relation to the teeth of the next element. This arrangement enables me to make an assembled gear with the required number of teeth and with the individual teeth of any element supported on arms of sufficient length to afford the necessary flexibility and at the same time, on account of the increasing width of the arm or extension as it approaches its base, the necessary strength is provided. A gear built up of elements of uniform thickness, as shown in Fig. 1, would, of course, have spaces on opposite sides of each individual tooth.

In order to make use of the waste room, incident to the elements of uniform thickness, I make the thickness of the toothed portions double that of the main or central portions of the elements. This may be done by cutting the teeth in thick disks and machining off one or both sides of the central portions to just over one-half of the thickness of the teeth so as to practically close the gaps, while still leaving individual freedom to the teeth after assembling. I have shown part of such a ring element in Fig. 2. As indicated, I may let the outer parts of the extensions have the same thickness as the teeth, so as to strengthen the support, and suitably machine down the inner parts to somewhat less than the thickness of the central portion, so as to give freedom of movement.

In Fig. 3 I have further shown a developed view of a section through the pitch circle of part of a built up wheel, which plainly indicates this method of closing up the gaps between the tooth elements, so that the teeth of the built up wheel will become practically continuous. This figure also shows the several plates and their teeth uniformly advanced one with respect to the other on their common axis with the result that the faces of the teeth instead of extending parallel to said axis form helices. When the teeth in the driving and driven gears are properly formed the action of one tooth on another will be rolling in character as distinguished from sliding as is the case with ordinary spur gearing. To state the matter in another way, there is practically a point of contact between engaging teeth which progressively moves from one side of the complete gears to the other.

The teeth of each element may be finished separately, and then accurately assembled, or they may be roughly finished, and finally cut, after being assembled, and suitable provisions may be made for preventing the teeth from moving axially during the final cutting operation.

In the form of my invention described with reference to Fig. 2, the flexibility is mainly provided by the extensions 4, and the central portion 5 yields very little or not at all, and is firmly clamped between the corresponding portions of the adjacent elements. The individual teeth thus deflect practically without interfering with the next teeth in the same ring element, but the mass taking part in the spring action is limited to the corresponding extension, and to increase this mass it is necessary to increase the radial dimension of the extension. The individual freedom required between two adjacent teeth on the same ring element is, however, not very large, as the error in the cutting in such a case would be small, and the more considerable errors, which the flexibility has to correct, depend on the width of the wheel and the alinement of the shafts. Thus it will not be a disadvantage if the relative flexibility between two such tooth elements is less than the total flexibility, and I may make the extensions comparatively short and instead have a wider ring portion, the outer part of which is flexible, as indicated in Fig. 4. I may further make this central portion so as to form three concentric parts, 5, 6, 7, of which the outer one 5 will be partly subjected to torsional stresses and will transmit the spring action over a large portion of the middle part 6, where the thickness is reduced as shown in Fig. 5, and the inner part 7 is firmly clamped in the ordinary way. By extending the spring action over a large surface in this way I obtain a large flexibility with a radially comparatively narrow central element, and this construction is on that account more specially suitable for pinions, where the diameter has to be kept down, while the type indicated in Fig. 2 is more suitable for larger wheels, and also for cases where the elements are built up in sections.

In the examples illustrated the elements have been provided with one-half of the number of teeth of the completed wheel. It is, however, also possible to use other proportions, and it will be easily seen that I could for instance use for the elements one-third of the teeth of the complete wheel. It would also be possible to use for instance two-thirds by placing the teeth on the elements in groups of two teeth with normal pitch, and having twice the normal pitch between the adjacent teeth of two groups as indicated in Fig. 6.

I may further use this invention in combination with the several arrangements, described in my before-mentioned patent application, Serial No. 639,210, and I also wish it to be understood that I am not limiting myself to the examples given, and I may use other combinations without departing from the spirit of the invention, and I may adopt any methods for efficiently producing the individual toothed ring elements, and for accurately assembling them to form a complete wheel or pinion.

What I claim as new and desire to secure by Letters Patent of the United States, is,—

1. A gear comprising a central or body portion provided with a plurality of radial arms yieldable axially of the gear with their outer ends thickened and shaped into tooth sections which collectively form helical teeth.

2. A helical gear built up of a plurality of elements, each element having a plurality of tooth sections constructed to yield axially upon the application of a tangential force and the number of tooth sections on each element being less than the number of teeth of the complete gear.

3. A helical gear built up of a plurality of transverse elements, each element having a plurality of radial arms yieldable perpendicularly to the plane of the element and provided at their outer ends with tooth sections.

4. A helical gear built up of a plurality of transverse elements, each element having a plurality of radial arms yieldable perpendicularly to the plane of the element and provided at their outer ends with tooth sections of a thickness greater than said element.

5. A helical gear built up of a plurality of transverse elements, each element having tooth portions extending outwardly therefrom, the number of said tooth portions on each element being one-half the whole number of teeth of the complete gear and the thickness of said tooth portions being substantially double the thickness of the body or central portion of an element.

6. A helical gear built up of a plurality of ring elements, each element having a plurality of arms or extensions carrying tooth sections at their ends and said ring elements being reduced in thickness at a point inside the tooth portions to render said arms or extensions flexible perpendicular to the plane of the element.

7. A helical gear having a plurality of tooth sections yieldable axially under the wedging action of a companion gear and arranged in staggered or stepped relation.

In witness whereof, I have hereunto set my hand this 24th day of July, 1912.

KARL ALQUIST.

Witnesses:
BENJAMIN B. HULL,
HELEN ORFORD.